United States Patent Office 3,267,474
Patented August 16, 1966

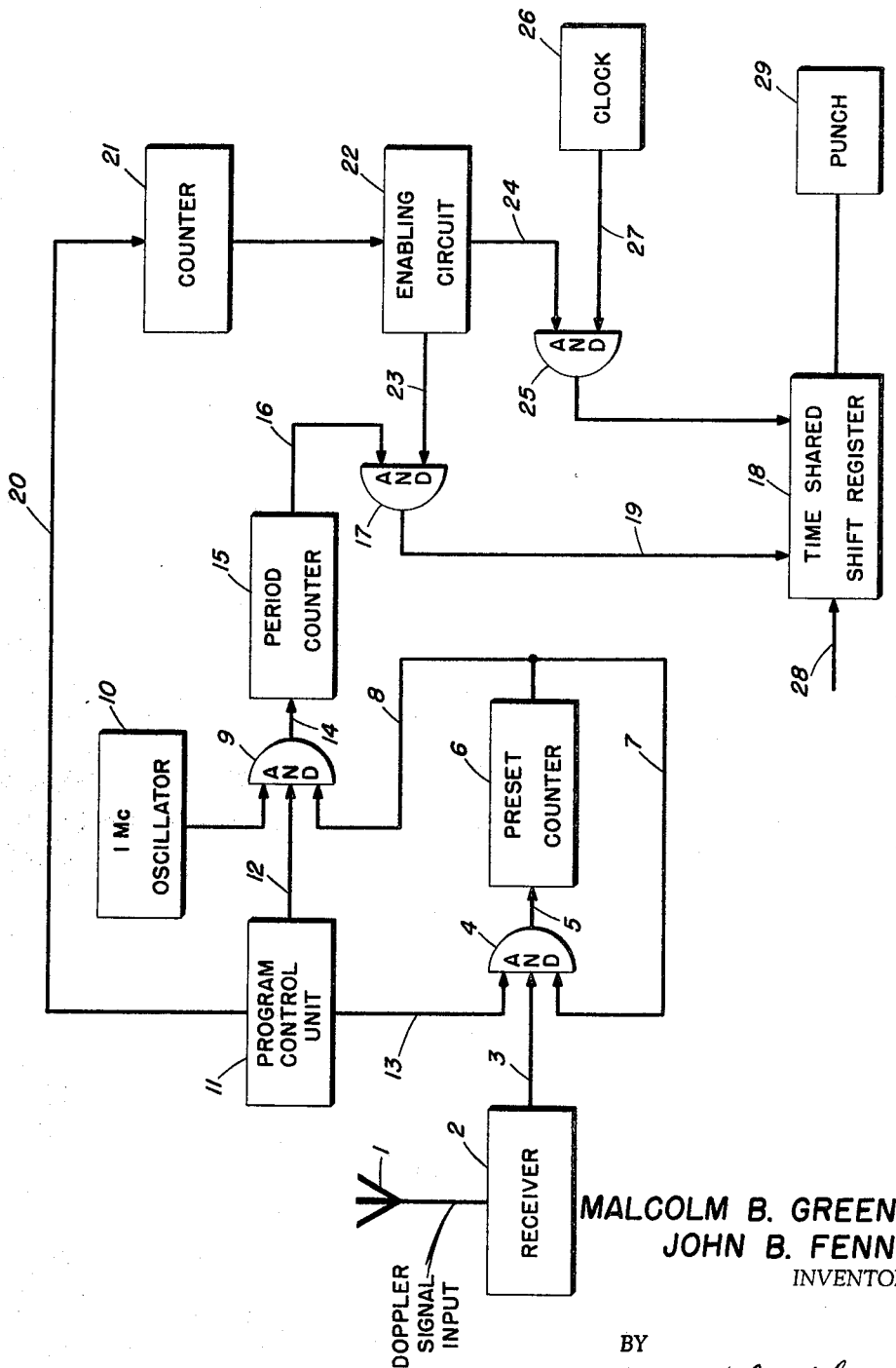

3,267,474
DOPPLER SHIFT DETECTOR
Malcolm B. Greenlee, Rockville, and John B. Fennell, Laurel, Md., assignors to the United States of America as represented by the Secretary of the Navy
Filed Feb. 24, 1964, Ser. No. 347,099
4 Claims. (Cl. 343—112)

The present invention relates generally to satellite tracking systems and more particularly to a system for determining the Doppler shift of a continuous wave transmission from an orbiting satellite.

The use of orbiting satellites for scientific exploration has created a need for exact tracking systems. A satellite cannot usually, because of space and weight limitations, contain the necessary equipment for transmitting its exact position to a ground tracking station. Instead, the position of a satellite must be determined from information which has been extracted at various ground stations from continuous wave transmissions which are sent from the satellite.

The present invention contemplates a system for measuring the Doppler shift in the frequency of a continuous wave transmission. The Doppler shift is the change in frequency that occurs in any continuous wave transmission when the transmitting signal source and the receiver are in motion relative to each other. As a satellite orbits, strategically located tracking stations receive the transmitted pulses and determine its Doppler period. The Doppler period, together with an exact indication as to the time at which it was measured, enable the tracking stations to compute the position of the satellite by wellknown least square fitting methods.

The present invention utilizes a preset counter, set to a predetermined number of counts, which receives the continuous wave transmission. A period counter is simultaneously utilized to indicate the total lapsed time from the beginning of a counting period until the preset counter has registered the predetermined number of counts. At this time, the count registered in the period counter is read out by means of appropriate circuitry. The period counter output indicates the length of time that was required to receive a predetermined number of pulses from the satellite transmitter, and the period of a transmitted pulse may be determined therefrom. The period of the transmitted wave is correlated with a highly accurate clock to determine the exact time at which the period was measured. The Doppler frequency is determined at the several tracking stations from the measurements of time and period.

An object of the present invention is to provide a system for determining the Doppler frequency shift in a continuous wave received from a moving transmitter.

Another object of the present invention is to provide a system for determining the position of a moving transmitter by the measurement of the Doppler frequency shift in the transmitted wave.

Other objects and many of the attendant advantages of this invention will be readily appreciated as the same becomes better understood by reference to the following detailed description when considered in connection with the accompanying drawing, wherein:

The figure is a block diagram of the system constituting the present invention.

Referring to the figure, an antenna 1 receives the pulses transmitted from an orbiting satellite (not illustrated) by a continuous wave transmitter contained therein. These pulses are first applied to the input of a receiver 2 and then by a lead 3 to an input terminal of an AND gate 4. The output of the AND gate 4 is applied by a lead 5 to the input of a preset counter 6.

The counter 6 produces an output bias level which enables the AND gates 4 and 9 connected thereto by a pair of leads 7 and 8. The counter 6 produces this output level until the predetermined number of counts has been registered. A counter which has proven to be satisfactory for use in the invention is a 20 bit binary counter manufactured as model BC-1 by the Packard Bell Corporation. When the counter 6 has registered the predetermined count, the bias level is removed from the leads 7 and 8 inhibiting the gates 4 and 9. A one megacycle oscillator 10 of extremely high precision is connected to another of the inputs of the gate 9. This frequency has been selected for computational ease, it being understood that other frequencies could be used.

A program unit 11 has two of its output leads 12 and 13 connected to one input of each of the AND gates 9 and 4 respectively. The program unit, in a manner to be explained, controls the timing sequence of the invention by enabling the appropriate gates and circuitry when a counting period is begun. The program unit also inhibits the various gates during the counting sequence so that the circuit will be receptive to a fiducial time signal from the satellite transmitter. A suitable program control unit may be readily assembled with model No. DC-1 circuit cards, manufactured by the Packard Bell Corporation.

The output lead 14 of the gate 9 is connected to a period counter 15 which has its output connected by a lead 16 to one of the inputs of an AND gate 17. The output of the gate 17 is connected to an input terminal of a time shared shift register 18 by a lead 19. The third output of the program unit 11 is connected over a lead 20 to the input of a counter 21, which has its output connected to the input of an enabling circuit 22. The counter 21 is a four bit binary counter having a plurality of output terminals which provide an output pulse every two, four, or eight seconds, the output pulse rate being controlled by conventional switching circuitry. The enabling circuit 22 is a flip-flop or a bistable multivibrator having one output lead 23 connected to the other input of the AND gate 17 and another output lead 24 connected to one of the inputs of an AND gate 25. A precision clock 26 is connected to the other input of the gate 25 by a lead 27. The output of the gate 25 is connected to the other input terminal of the register 18. The program control unit 11 synchronously applies enabling pulses over the leads 12, 13, and 20 to the gates 9 and 4 and the counter 21 respectively. The output pulses from the counter 21 toggle the enabling circuit at the selected rate, and thereby determine the operating speed of the system as will be seen. The positive pulse output from the circuit 22 enables the gate 17 over the lead 23 while the negative pulse output from the circuit 22 enables the gate 25 over lead 24.

In operation, the pulses transmitted from the satellite are received by the antenna 1 and applied to the input of the receiver 2 and, subsequently, to one of the inputs of the gate 4. The counter 6 applies an enabling bias level to leads 7 and 8 until the predetermined number of counts has been registered, and then removes the bias level. The counter 6 registers one count for every positive going, zero crossing of the input wave, indicating the number of Doppler pulses which have been received. The zero crossing point has been selected to eliminate counter errors due to signal level fluctuations. During the period in which the gate 9 is enabled, the output pulses from the oscillator 10 are counted by the period counter 15.

When the bias level is removed from the leads 7 and 8, the gates 4 and 9 are inhibited. The count which has been registered in the period counter 15 indicates the length of time which was required to receive a predetermined number of input pulses from the satellite. Thus, the period of the wave received at the antenna 1 may be determined from the output of the counter 15. Simultaneously with the measurement of the Doppler period as described above, the clock 26 continually runs and provides an output to the AND gate 25, indicating the exact time of day.

The enabling circuit 22, by sequentially enabling the two gates 17 and 25, allows the output of the period counter 15 and the clock 26 to be sequentially memorized by the time shared shift register 18. After the program control unit 11 has energized the counter 21, the first output from the circuit 22 is a negative level on the lead 24. This negative level enables the gate 25 and gates the exact time of day to the register 18. During this negative level period, but subsequent to the memorizing of the time of day by register 18, a read pulse is applied over a line 28 and the time of day is read out into a tape punch 29 or an equivalent indicating means. The read pulse is generated from the enabling circuit and applied to the lead 28 by conventional circuitry which, for clarity, has not been illustrated.

After the time of day has been recorded, the enabling circuit 22 switches to its other stable state, inhibiting the gate 25 and enabling the gate 17 with a positive level on the lead 23. The gate 17 then transfers the period indication from the counter 15 to the register 18. After the register has memorized the period indication, before the positive level is removed from the lead 23, the period indication is read out of the register 18 to the punch by pulse on the lead 28. The tape punch, thus, contains a time indication followed by a period indication for each counting period, from which the Doppler frequency can be determined.

The manner in which the counter 21 controls the speed of operation of the invention may be readily seen. If the counter 21 is adjusted to produce an output pulse once every two seconds, the time indication is recorded during the two second period in which the circuit 22 remains in the first of its stable conditions. The succeeding output pulse from the counter 21 switches the circuit 22 to its other stable condition for a two second period during which the period indication is recorded. Similarly, if the counter 21 is adjusted to produce an output every four seconds, the total time required to record both a time and a period indication is eight seconds. The output pulse durations of the counter 21 has been selected to be time compatible with commercially available shift register and tape punch equipment.

Obviously, many modifications and variation of the present invention are possible in the light of the above teachings. It is therefore to be understood that within the scope of the appended claims the invention may be practiced otherwise than as specifically described.

What is claimed is:

1. A Doppler frequency measuring system comprising means for receiving Doppler pulses,
   a preset counter for counting said Doppler pulses to a predetermined number,
   an oscillator,
   a period counter for counting the pulses from said oscillator,
   control means for stopping the counting of said period counter when said preset counter has registered the predetermined number of counts,
   a clock, and
   display means for presenting the time indication from said clock together with the output of said period counter whereby the Doppler frequency of said pulses may be determined.

2. The Doppler frequency measuring system of claim 1 in which said control means is an AND gate, said gate being enabled by said preset counter.

3. The Doppler frequency measuring system of claim 1 in which said display means includes a time shared shift register, said register receiving said time indication and the output of said period counter sequentially.

4. The system of claim 3 further including a flip-flop enabling circuit for alternately applying the outputs of said clock and said period counter to said shift register.

References Cited by the Examiner

UNITED STATES PATENTS 3,172,108   3/1965   McClure.

OTHER REFERENCES

Hupp: "Frequency Counter," Instruments and Control Systems, October 1960, page 1715.

CHESTER L. JUSTUS, *Primary Examiner.*

R. E. BERGER, *Assistant Examiner.*